(12) United States Patent
Haverstock (10) Patent No.: US 8,893,610 B2
(45) Date of Patent: Nov. 25, 2014

(54) COFFEE INFUSION PRESS FOR STACKABLE CUPS

(76) Inventor: Thomas B. Haverstock, Palo Alto, CA (US)

( * ) Notice: Subject to any disclaimer, the term of this patent is extended or adjusted under 35 U.S.C. 154(b) by 1439 days.

(21) Appl. No.: 12/157,761

(22) Filed: Jun. 12, 2008

(65) Prior Publication Data

US 2008/0245237 A1    Oct. 9, 2008

Related U.S. Application Data (63) Continuation of application No. 10/748,416, filed on Dec. 30, 2003, now Pat. No. 7,389,720.

(51) Int. Cl.
*A47J 31/00* (2006.01)
*A47J 31/20* (2006.01)

(52) U.S. Cl.
CPC ..................................... *A47J 31/20* (2013.01)
USPC .............................................. 99/297; 99/298

(58) Field of Classification Search
USPC ........... 99/279, 287, 295, 317, 318, 319, 322, 99/323, 323.3; 426/241, 234, 594, 598, 426/590, 466, 580, 585, 519, 431, 597, 432
See application file for complete search history.

(56) References Cited

U.S. PATENT DOCUMENTS

| | | | |
|---|---|---|---|
| 642,262 A | 1/1900 | Sarles et al. | |
| 2,204,158 A | 6/1940 | Serio et al. | |
| 3,935,318 A | 1/1976 | Mihailide | 426/80 |
| 4,643,981 A | 2/1987 | Card | 436/500 |
| 4,909,932 A | 3/1990 | Monnet | 210/98 |
| 5,461,968 A | 10/1995 | Portman | |
| 5,618,570 A | 4/1997 | Banks et al. | 426/435 |
| 5,635,233 A | 6/1997 | Levinson | 426/433 |
| 5,770,074 A | 6/1998 | Pugh | |
| 5,780,087 A | 7/1998 | Brady | |
| D401,466 S | 11/1998 | Joergensen | |
| 5,887,510 A * | 3/1999 | Porter | 99/287 |
| 5,943,946 A | 8/1999 | Chen | |
| 6,038,963 A * | 3/2000 | Patterson et al. | 99/287 |
| RE37,137 E | 4/2001 | Ghidini | |
| 6,231,909 B1 * | 5/2001 | Levinson | 426/433 |
| 6,423,223 B1 | 7/2002 | Northcut et al. | |
| D463,946 S | 10/2002 | Yeh | |
| 6,521,124 B2 | 2/2003 | Northcut et al. | |
| 6,797,160 B2 | 9/2004 | Huang | 210/117 |
| 6,797,304 B2 | 9/2004 | McGonagle | |
| D571,610 S | 6/2008 | Bodum | |
| 7,389,720 B2 | 6/2008 | Haverstock | 99/297 |
| D626,621 S | 11/2010 | Olson et al. | |

OTHER PUBLICATIONS

Office action that was mailed on May 29, 2012, U.S. Appl. No. 29/387,869, filed Mar. 18, 2011, 11 pages.

* cited by examiner

*Primary Examiner* — Thien S Tran
(74) *Attorney, Agent, or Firm* — Haverstock & Owens LLP (57) ABSTRACT

A press assembly is adapted to be used with a disposable stackable cup. According to the preferred embodiment, the press includes a filter. A resilient radially compressible support forms a seal is formed between the filter and the interior of the cup. A detachable rod is mounted to the support. The support is sized to accommodate all radii of the cup. As the user presses down the rod, the press assembly is pushed downward to the bottom of the vessel. The seal maintains continual and firm pressure on the inside surface of the vessel so that the pressurized liquid passes through the filter and the infusion substance is trapped.

12 Claims, 12 Drawing Sheets

COFFEE INFUSION PRESS FOR STACKABLE CUPS

This Patent Application is a continuation of U.S. patent application Ser. No. 10/748,416 now U.S. Pat. No. 7,389,720, filed on Dec. 30, 2003.

FIELD OF THE INVENTION

This invention relates to the field of beverage infusion. More particularly, this invention relates to a press type infusion system for making coffee and tea which is adaptable for stackable and disposable cups.

BACKGROUND OF THE INVENTION

The essence of a solid material can enter a liquid through a process known as infusion, wherein the solid material is placed into a liquid for a sufficient period of time and the essence passes from the solid material into the liquid. In a well known infusion process, the essence of coffee, including flavor, color and often caffeine enter heated water. It will be readily understood by those of ordinary skill in the art that caffeine is substantially not available to enter the liquid when the coffee has been decaffeinated. There are many conventional coffee makers that can be used to perform the process and include a percolator and drip type coffee maker. In such coffee makers, hot water is passed through the coffee grounds using gravity. A known quality of the coffee beverage is produced using such methods. In a percolator, the water is continuously heated and repeatedly passed through the grounds. In addition, coffee bags similar to conventional tea bags have also been introduced, wherein a filter bag of ground coffee is dipped into a hot cup of water using a string.

The coffee grounds are held together in each of a percolator, drip and bag infusion approach. In a conventional drip type coffee maker, ground coffee is held in a conical filter and appropriately sized filter housing. Hot water is poured into the ground coffee and passed once through the coffee grounds. In another well known process in an espresso machine, heated water and/or steam is forced through compressed coffee grounds to perform the infusion process.

Often, for dispensing of coffee drinks, a full pot of coffee is made and then maintained at a high temperature to be ready for dispensing to and consumption by a consumer. Unfortunately, the continual application of heat to prepared coffee can burn the coffee, thereby deteriorating its flavor and desirability. Also, coffee that is made and stored in an insulated thermal pot quickly degrades in its flavor. Though the precise mechanism for the degradation of the prepared and stored coffee is not well known, it is possible that the degradation occurs through a chemical reaction, such as by oxidation. In any case, it is generally recognized and accepted that freshly made coffee has superior flavor to 'old' coffee.

Tea, herbal tea, medications, chemical preparations and other liquids can also be produced using infusion. Tea bags are well known for infusing tea. However, some tea drinkers have long believed that loose teas provide a superior tea beverage to tea bags. One theory is that the hot water is provided free unrestricted access to all surfaces of the tea. This is especially true when the preparer stirs the loose tea in vessel while steeping the beverage. However, owing to the substantial convenience of tea bags relative to the clean-up problem associated with loose tea in the bottom of a pot, the use of tea bags is universally accepted and preferred. Though it will be recognized that infusion can take place for coffee, tea, herbs, medicines, or chemicals as well as other substances into water and/or other liquids, to avoid unnecessarily complicating the following discussion with extraneous detail, the remainder of this document will refer only to coffee, though other beverages and infusions are contemplated.

Figure 1:
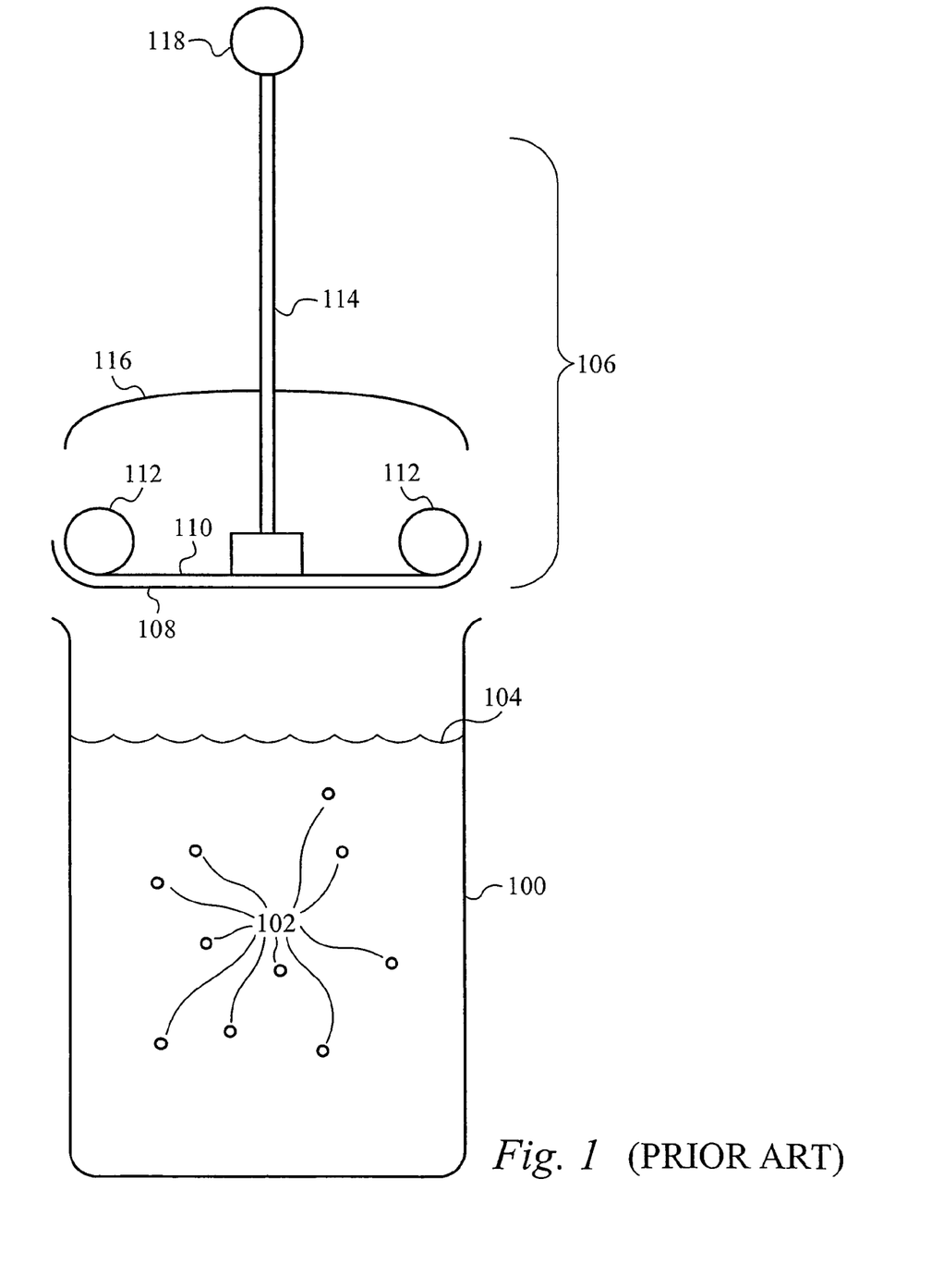
FIG. 1 shows a schematic cross section of a prior art coffee press with the press assembly in a raised, undeployed condition.

The press or so-called French Press is well known for making superior coffee infusions. FIG. 1 shows a conventional coffee press. A vessel 100 is provided for steeping the beverage. A measure of coffee grounds or tea 102 is provided in the vessel 100 along with hot water 104. The preparer can stir the hot water 104 during the infusion process to better promote the amount of infusion that takes place as desired. Once the desired extent of infusion is achieved, the preparer activates the press assembly 106 to slow or stop the infusion process.

Figure 2:
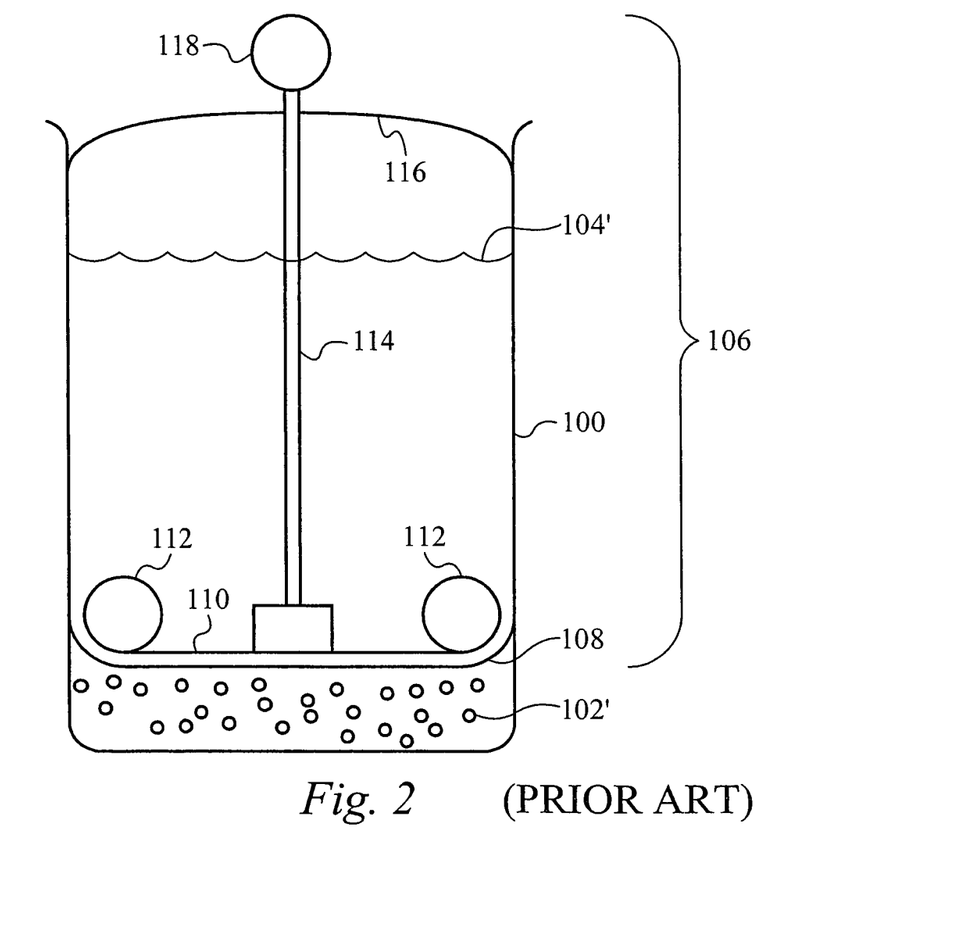
FIG. 2 shows a schematic cross section of the prior art coffee press of FIG. 1 with the press assembly in a lowered, deployed condition.

To stop the infusion process, a conventional press assembly 106 is provided to confine the coffee grounds separate from the infused liquid coffee. The preparer depresses the press assembly 106 to the bottom of the vessel 100. This action traps the coffee grounds 102' between the press assembly and the bottom of the vessel 100 (FIG. 2). Thereafter, the infused coffee beverage 104' can be dispensed from the vessel 100 without any coffee grounds 102 or 102' being present in the beverage to detract from the enjoyment of the beverage.

The press assembly 106 includes a filter screen 108. The filter screen 108 is configured to easily pass water but not coffee grounds. The conventional press assembly 106 includes a filter screen 108 which has openings sized to allow water or liquid to pass there through but to prevent coffee grounds from escaping above the filter into the beverage to be dispensed. Conventional filters in a French Press are formed of a pliant, flexible screen having small apertures to allow passage of the infused liquid. Conventionally, the filter screen 108 is slightly larger than the size of the opening of the vessel 100 to ensure that the filter screen 108 maintains positive and intimate contact with the interior surface of the vessel 100. Generally, the edges of the filter screen 108 are turned up. A pressing plate 110 is mounted over the filter screen 108. The pressing plate 110 includes a plurality of apertures to expose the filter screen 108 to the liquid. A coiled pressure spring 112 is circumferentially mounted to and around the exterior of the pressing plate 110 as well as adjacent and within the turned up edges of the filter screen 108. In this way, as is well known the pressure spring 112 applies outward pressure on the filter screen 108, to hold the filter screen 108 firmly against the inner wall of the vessel 100. This pressure prevents coffee grounds from escaping past the filter screen. Once the appropriate level of infusion has occurred, the user then depresses the press assembly using a plunger rod 114. Most press assemblies also include a vessel lid 116 and a rod end 118 for comfort to the user and also to prevent the lid from being removed from the rod 114.

For a conventional coffee press, it is important that the interior radius of the vessel be constant from its upper opening to its base. This allows the press assembly 106 to engage the inner wall of the vessel 100 from the top of the vessel 100 and throughout the traverse of the press assembly until it reaches the bottom of the vessel 100. As the press assembly 106 is pressed downwardly, the pressure of the liquid becomes greater under the filter screen 108. The increased pressure causes the infused liquid to pass through the filter screen leaving the coffee grounds 102 below the press assembly 106 and trapped against the bottom of the vessel 100. In the event that the radius of the vessel 100 is not constant and increases even momentarily causing a void between the press assembly 106 and the vessel 100, such as by a swelling of the vessel or owing to some other defect in a sidewall of the vessel 100, the pressurized liquid will seek to escape to the region above the press assembly 106 and pass rapidly through the void. Hence, in nearly every occurrence the void will cause coffee grounds to escape from below the press assembly 106 through the void. Generally, the liquid passing through the void forms a turbulent relatively high speed stream. Once this occurs, the user is unfortunately subjected to drinking coffee having undesirable coffee grounds contained therein. Drinking a coffee beverage that contains coffee grounds is unpleasant.

It is generally accepted that press made coffee and tea is superior to such beverages made by other techniques. However, in spite of the superior beverage made with a press, infusion presses have only gained limited acceptance. One reason for this limited acceptance is related to the difficulty and necessity surrounding cleaning the press. Upon completion of a pot of coffee made from a press, the press element must be removed from the vessel. Then, the grounds must be removed from the vessel. The removal of the grounds is a messy operation generally resulting in substantial grounds going down the drain.

Others have developed single serving sized press cups. These cups are sized to allow a user to prepare a single serving of press beverage. Unfortunately, as will be explained in more detail below, because the radius of the cup must be constant from its top opening to the bottom, the single serving sized press cups are made of glass, plastic or porcelain and hence are not economically disposable. This makes such cups unsuitable for several reasons. First, the cup and press assembly must be thoroughly cleaned to remove the trapped grounds after each cup is prepared and dispensed. The process of cleaning a press vessel is cumbersome in that it requires the press assembly to be withdrawn and then the coffee grounds to be removed before the washing process. Care must generally be taken to avoid allowing the grounds to pass into a sink or drain. Too many coffee grounds in the drain can cause the sink or drain to clog. Second, because such single sized press cups are not disposable, users cannot purchase a 'to go' cup of pressed coffee. This is unfortunate because pressed coffee is generally considered to be vastly superior in flavor to brewed or dripped coffee, even 'on the go.'

Figure 3:
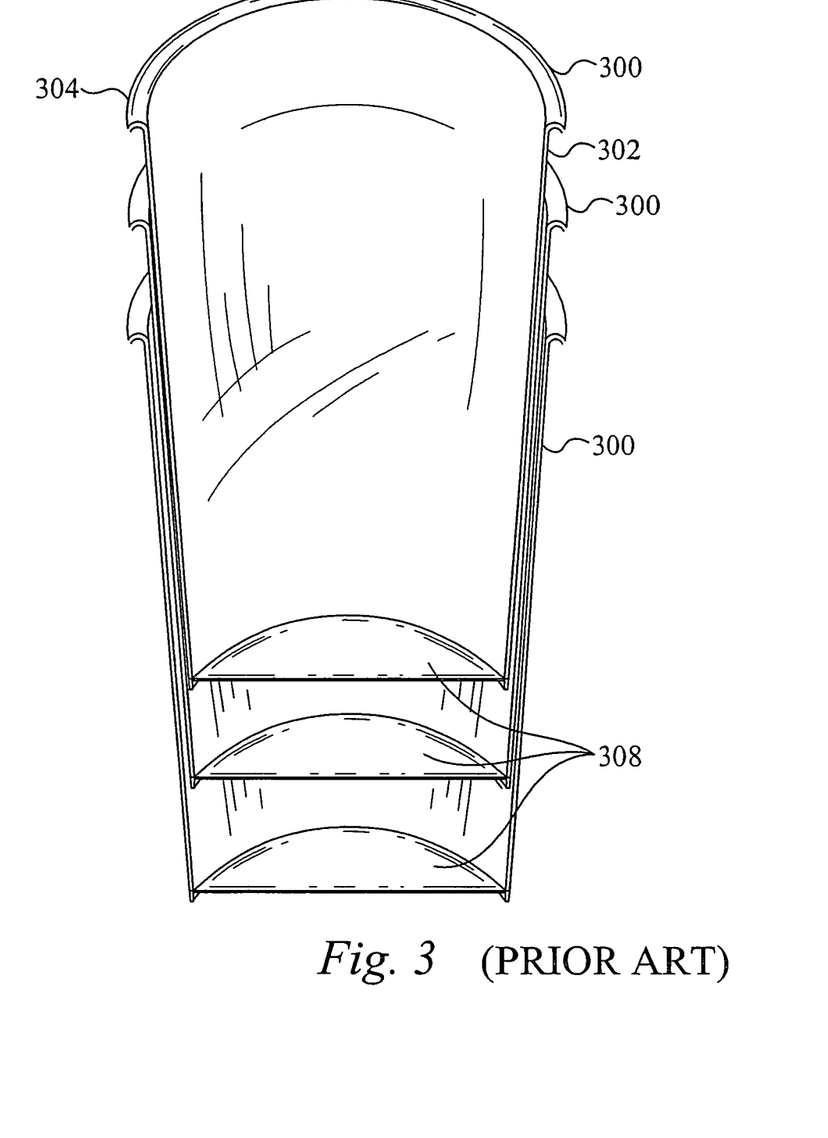
FIG. 3 shows a cross section of a stack of prior art beverage cups.

For many applications involving dispensing of drinks, especially for the vending of drinks in a disposable cup, it is desirable that each of the cups 300 have a wider radius at their opening than at their bottom as shown in FIG. 3. Generally the dimension of the radius of each cup 300 varies linearly and decreases from the opening to the bottom. Such cups 300 have the shape defined in mathematics as a right circular conical frustum. This conical frustum shape allows users to nest the cups together in convenient stacks in the usual way as schematically shown in FIG. 3. The cups in FIG. 3 generally show a commonly available paper cup found in many coffee restaurants. Each of these cups 300 is formed of a paper side wall 302. The sidewalls are formed into a conical shape and adhesively seamed. A lip 304 is formed at the top of the cup 300 by a rolled rim of the same paper used to form the sidewalls 302. As is known, the lip 304 can be partially rolled or formed into a small tube. A bottom 308 is adhesively attached into each paper cup 300. The cup in FIG. 3 is representative only. It is well known that a variety of cup configurations are commercially available which generally have a conical frustum shape.

As is well known, the use of nesting allows a large number of cups to be stored in a relatively small space. Were it not for the ability to nest cups in this way, it would be impractical for drink vendors which use disposable cups to economically maintain a sufficient inventory of cups on hand in an small location.

It is readily apparent that a conventional press assembly cannot be used with a conical frustum cup because of the varying radius of the cup. If the press assembly 106 was appropriately sized to fit the radius of the cup near the bottom, the press assembly 106 would not make contact with the interior of the cup at the upper region thereby failing to keep the coffee grounds below the press assembly 106. Likewise, if the press assembly was appropriately sized to fit the radius of the cup near the opening at the top of the cup 300, it would be unable to be pressed to the bottom of the cup 300. If the press assembly is unable to reach to the bottom of the cup, the beverage is unavailable for consumption by the user. Either situation is unacceptable. Owing to at least these failures, no one heretofore has introduced a press assembly for single sized disposable conical frustum cup.

What is needed is a press assembly that can be used in a cup or vessel that has a radius which varies in size. What is further needed is a press assembly that can be used in a cup that has a radius that decreases linearly from the upper opening to the bottom of the cup. Further, a press assembly is needed for use in a conical frustum cup which is readily disposable.

BRIEF SUMMARY OF THE INVENTION

The present invention is for a press assembly adapted to be used with a vessel having a conical frustum shape, such as a conventional stackable disposable coffee cup. According to the preferred embodiment, the press includes a filter and a pressing member used for support which are radially compressible. The filter is preferably formed of an open cell foam. The foam includes apertures sized such that water or other liquid can pass through the foam but particles the size of coffee grounds cannot pass. A particle tight seal is formed between the filter and an interior surface of the cup. A radially compressible pressing member is sized to have a range of radii sufficient to allow the pressing plate to substantially maintain intimate contact with the interior surface of the cup from the top of the cup to the bottom and over a range of radii. A pushing rod is mounted to the pressing member to allow a user to push the pressing plate to the bottom of the cup. Preferably, the pushing rod is separate but attachable to the pressing plate.

A user places a measure of an infusion substance, such as coffee into a conical frustum vessel, such as a stackable disposable cup, and allows the beverage to infuse a desired amount. In anticipation of the conclusion of the infusion process, the user installs the press assembly by inserting it into the open top end of the vessel. In many circumstances the user will choose to stir the beverage to enhance and/or speed the infusion process; in such circumstances, the installation of the press assembly can be delayed. Preferably, the resilient radially compressible seal will fit snugly into the opening. As the user presses down the rod, the press assembly is pushed downward to the bottom of the vessel. The radius of the pressing member varies to accommodate the varying radii of the cup. In this way, the pressing member causes the filter to maintain continual and firm pressure on the inside surface of the vessel so that the pressurized liquid passes through the filter and the infusion substance is trapped.

The preferred embodiment of the present invention contemplates several optional enhancements. The radially compressible pressing plate can include a plurality of small hook elements to engage and hold the foam filter. The pushing rod can be detached and attachable either by friction or by a snap fit to provide more efficient packaging of multiple filter assemblies within a shipping carton. A cup lid can include a hole adapted to receive the plunger rod, such that the press assembly can be mounted within the cup but not deployed to compress the coffee grounds into the bottom of the cup. Thus, during the infusion process the cup lid can be securely mounted in place to protect the user and their belongings.

The plunger rod can include an expanded flat head with a T-shaped cross section to provide enhanced comfort to the user when deploying the press assembly. The length of the pushing rod can be sized such that the top is approximately coplanar with the cup lid once the press assembly is deployed. A plurality of press assemblies packaged in a shipping carton can include a selection of plunger rod sizes to accommodate a variety of cup sizes. Alternatively, the plunger rod can include features to enhance breaking the plunger at predetermined lengths to accommodate a variety of cup sizes. Each of these break-enhancing features can be immediately above a corresponding series of T-shaped heads.

According to the preferred embodiment, the press assembly includes a circular foam filter. The diameter of the foam filter is sized to be slightly larger that the upper inner radius of the cup. The foam filter is sufficiently compressible that it will readily compress to fit within the lower inner radius of the cup as well. The foam filter is only thick enough to provide adequate filtering characteristics and prevent coffee grounds from entering the beverage above the press assembly. However, the foam filter is made as thin as possible to avoid consuming substantial volume in the cup. A radially compressible filter support is mounted to the foam filter to aid in maintaining the foam filter in close contact with the interior surface of the cup. A rod is mounted to the radially compressible filter support to allow a user to push the filter assembly to the bottom of the cup.

This invention contemplates several alternate embodiments. In one alternate embodiment, the foam filter is sufficiently thick or rigid to maintain adequate contact with the interior of the cup without the use of a radially compressible pressing plate. Generally, the foam-only press assembly preferably uses a foam that is anisotropic, in that it compresses more readily inwardly along the radius of the cup rather than parallel to the plunger rod.

In a second alternate embodiment, a compressible resilient annular ring is adapted to contact the interior of the cup. The ring includes a central major aperture. The major aperture is covered with a conventional filter made of paper or a screen. It is important that the seal between the resilient radially compressible seal be sufficiently snug to prevent any particles from passing by the press assembly. In this way, as the press assembly of the present invention is moved to the bottom of the vessel, the liquid and infusion material do not pass between the resilient radially compressible seal and the side wall of the vessel. Rather, the liquid passes through the filter. Thus, solid particles, such as all the coffee grounds, are trapped below the press assembly.

In one version of this alternative, the annular ring is formed of a foam ring. In this embodiment, the foam ring may but need not also act as a filter. The foam ring has an outer radius and an inner radius; the major aperture is formed within the inner radius. The foam ring is sized to fit within the opening of the vessel under zero or slight radial compression. A pressing plate having a plurality of openings is mounted to an upper surface of the foam ring. The pressing plate is sized having a radius larger than the inner radius and smaller than the outer radius of the foam ring. Further, the radius of the pressing plate is sufficiently small that the pressing plate can readily fit within the bottom of the vessel. The pressing plate also includes a cup shaped receiver sized to receive and hold by friction a pushing rod. The pressing plate can be attached to the foam ring by adhesive or alternatively, by integrally formed The rod is of a size and length to remain only slightly out of the vessel after the press assembly is fully pressed into the vessel.

A filter screen or filter paper is mounted to cover the aperture through the foam ring. The filter can be adhesively attached to the foam ring. The filter can be mounted to a lower surface of the foam ring, or preferably is mounted to the upper surface of the foam ring between the foam ring and the pressing plate. In this way, the pressure on the foam ring by the pressing plate firmly holds the filter in intimate contact with the foam ring thereby preventing any escape of the infusion substance.

It is expected that the ring, pressing plate and filter will be pre-assembled during manufacture. This allows several of these pressing sub-assemblies to be stacked compactly upon one another. Upon deployment of the press assembly, the user can readily insert the pressing rod into the receiver. In yet another version of this embodiment, the ring is mechanically compressible.

Another alternate embodiment contemplate several articulated leaf elements rotatably mounted to one another such that the assembly is formed in a ring that has an interior radius and an exterior radius. As the leaves rotate relative to one another, the exterior radius changes. A filter element, such as a foam filter or a paper filter covers the interior opening of the ring. A rod is coupled to the assembly for pushing it to the bottom of a cup.

DETAILED DESCRIPTION OF THE INVENTION

The present invention is described in reference to the drawings appended to this document. Where elements are identical among more than one view or embodiment, the same reference numerals are used to avoid confusion.

The present invention is principally directed toward a press assembly for use in making a coffee or tea infused beverage. The press assembly of the present invention is configured to intimately engage the interior wall of a conical frustum cup, such as found in any coffee vending store or restaurant. Ideally, the press assembly is capable of being manufactured at a cost sufficiently low that it is commercially feasible for use as a disposable item while adding only insignificantly to the cost of preparing and serving a cup of coffee. In particular, it is anticipated that a vendor of coffee beverages desiring to sell a superior cup of coffee will offer their customers a pressed cup of coffee. In this way, a convenient rapid method of preparing a single cup of coffee is provided, such that larger batches of coffee need not be prepared and stored to undesirably allow the coffee to degrade.

Conventional commercial coffee vending occurs in disposable cups having a conical frustum shape. In use, the disposable press assembly of the present invention is also used disposably. In particular, a vendor will place a measure of ground coffee into a disposable cup. The cup will typically be a disposable conical frustum. The vendor will then pour hot water into the cup to infuse the essence of ground coffee into the liquid. A disposable press assembly will be engaged into the upper portion of the cup. After a suitable period of time to allow sufficient infusion to suit the taste of the user, a rod mounted to the press assembly will be employed to push the press assembly and thus the ground coffee to the bottom of the cup and be separate from the beverage. It is possible for a user to place a lid of the usual kind but having a hole positioned to accept the rod onto the top of the cup while the beverage is being infused. It is possible for a user to put cream, milk or a creamer into the liquid either before the press assembly is placed into the cup or onto of the press assembly, and either before or after the infusion process.

Figure 4:
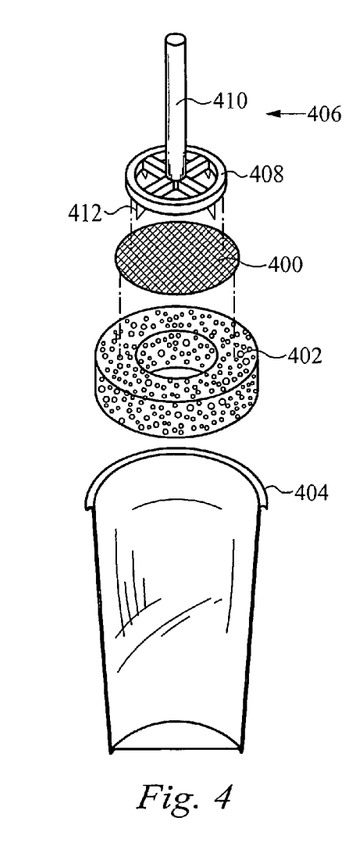
FIG. 4 shows a perspective view of a first embodiment of the present invention, in relation to a perspective section of a beverage cup.

FIG. 4 shows a perspective view of a first embodiment of the present invention, in relation to a perspective section of a beverage cup 404. A filter membrane 400 is used to separate the coffee grounds from the beverage. The filter membrane 400 can be of any convenient type but is preferably a paper filter. The filter membrane 400 is supported from below by a compressible structure 402. The compressible structure 402 can be formed of foam, such as either a closed cell or open cell foam. Preferably, the foam is formed of an anisotropic foam so that is compresses radially more readily than it compresses vertically. The foam is formed or cut as a ring such that the filter membrane 400 has direct access to the liquid. The foam maintains positive contact with the interior surface of the cup 404.

A pushing assembly 406 includes a pressing plate 408 and a rod 410. The pressing plate 408 is preferably circular and has a radius smaller than the smallest interior radius of the cup 404. The rod 410 is preferably sized to just allow a user to fully deploy the press assembly to the bottom of the cup, but not leave a long projection once deployed to poke the user or interfere with drinking the beverage. Preferably, the rod 410 is sized to be substantially coincident with the top of the cup 404, or with the upper surface of a lid (414 in FIG. 7), if a lid is employed. Ideally, pressing plate 408 and the rod 410 are formed of plastic and are injection molded. The pressing plate 408 and the rod 410 can be configured as two pieces which are joined by mating the rod 410 to an aperture formed in the pressing plate 408 or integrally formed as a single molded piece. The pushing assembly 406 can be assembled by an adhesive or preferably with barbs 412 formed in a bottom surface of the pressing plate 408 to penetrate and engage the foam compressible structure 402.

Figure 5:
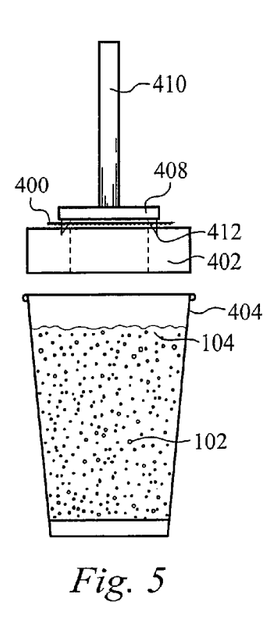
FIG. 5 shows a side view of the embodiment of the present invention of FIG. 4, in relation to a cross section of the beverage cup prior to engagement of the press assembly with the cup.
Figure 6:
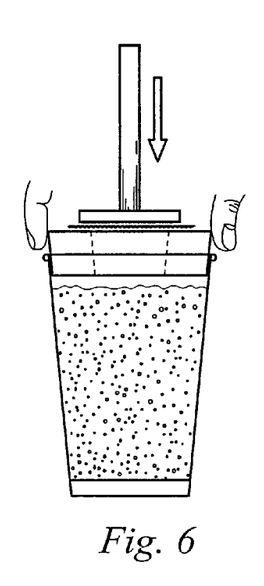
FIG. 6 shows a side view of the embodiment of the present invention of FIG. 4, in relation to a cross section of the beverage cup as the press assembly is engaged with the cup.
Figure 7:
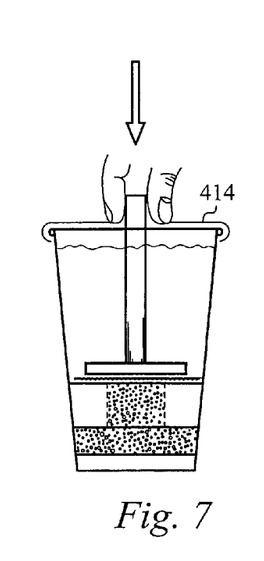
FIG. 7 shows a side view of the embodiment of the present invention of FIG. 4, in relation to a cross section of the beverage cup as the press assembly is deployed to the bottom of the cup.

FIG. 5 shows a cup which contains coffee grounds 102 and hot water 104 for the infusion process. The press assembly is brought to but is not yet engaged with the cup 404. FIG. 6 shows a side view of the embodiment of the present invention of FIG. 4, in relation to a cross section of the beverage cup as the press assembly is engaged with the cup 404. A user manually compresses the compressible structure 402 while inserting the press assembly into the cup 404. After the completion of the infusion process, the user pushes the rod 410 to push the press assembly to the bottom of the cup as shown in FIG. 7. The ground coffee is pushed to the bottom of the cup and kept below the press assembly and within the ring of the compressible member 402. FIG. 7 shows the construction with a lid 414 mounted to the cup 404. The lid 414 includes a first aperture to receive the rod 410. The lid 414 can include a second aperture to allow the user to drink the beverage while both the lid and the press assembly are in place.

Figure 8:
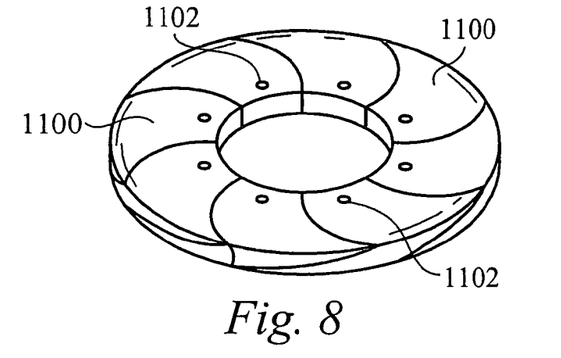
FIG. 8 shows a perspective view of a second embodiment to the press assembly.

FIG. 8 shows a perspective view of an alternate embodiment to the press assembly. A plurality of overlapping leaves 1100 are mounted to one another about hinge axes 1102. The assembly is formed in a ring having an interior opening with an interior radius and also an exterior radius. As the leaves 1100 rotate inwardly about the hinge axes 1102, the exterior radius of the assembly decreases. The shape of the outer edge of each leaf 1100 is appropriately curved so that the exterior circumference of the assembly maintains intimate contact with the interior of a conical frustum cup. A paper filter (not shown) can be adhesively attached to cover the interior opening to filter coffee. A pressing assembly and rod (not shown) can be employed to push the assembly of FIG. 8 to the bottom of the cup. Preferably the pressing assembly attaches to at least three of the hinge axes 1102.

Figure 9:
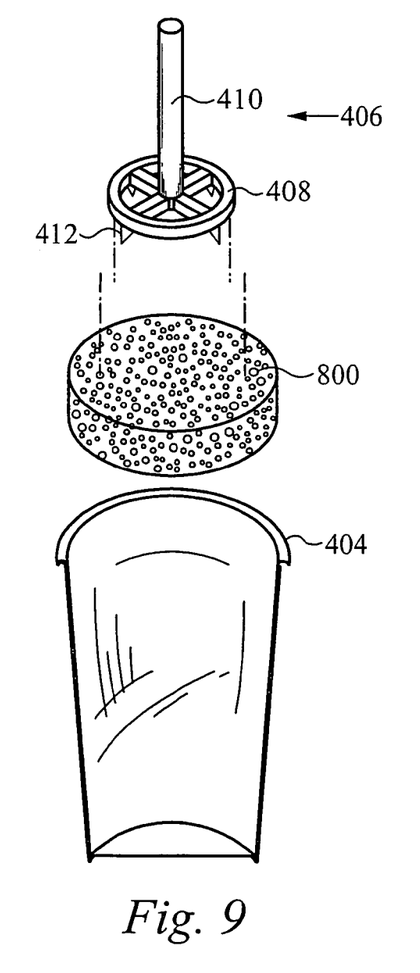
FIG. 9 shows a perspective view of a third embodiment to the press assembly.

FIG. 9 shows a perspective view of a third embodiment of the present invention, in relation to a perspective section of a beverage cup 404. A compressible filter member 800 is used to separate the coffee grounds from the beverage. The filter member 800 can be formed of foam, such as either a closed cell or open cell foam. Preferably, the foam is formed of an anisotropic foam so that is compresses radially more readily than it compresses vertically. The filter member 800 maintains positive contact with the interior surface of the cup 404.

A pushing assembly is provided. The pushing assembly can, but need not be identical to the pushing assembly described relative to the first embodiment in FIG. 4. If is it identical, the pushing assembly 406 includes a pressing plate 408 and a rod 410. The pressing plate 408 is preferably circular and has a radius smaller than the smallest interior radius of the cup 404. The rod 410 is preferably sized to just allow a user to fully deploy the press assembly to the bottom of the cup, but not leave a long projection once deployed to poke the user or interfere with drinking the beverage. Preferably, the rod 410 is sized to be substantially coincident with the top of the cup 404, or with the upper surface of a lid (414 in FIG. 7), if a lid is employed. Ideally, pressing plate 408 and the rod 410 are formed of plastic and are injection molded. The pressing plate 408 and the rod 410 can be configured as two pieces which are joined by mating the rod 410 to an aperture formed in the pressing plate 408 or integrally formed as a single molded piece. The pushing assembly 406 can be assembled by an adhesive or preferably with barbs 412 formed in a bottom surface of the pressing plate 408 to penetrate and engage the foam compressible structure 402.

Figure 10:
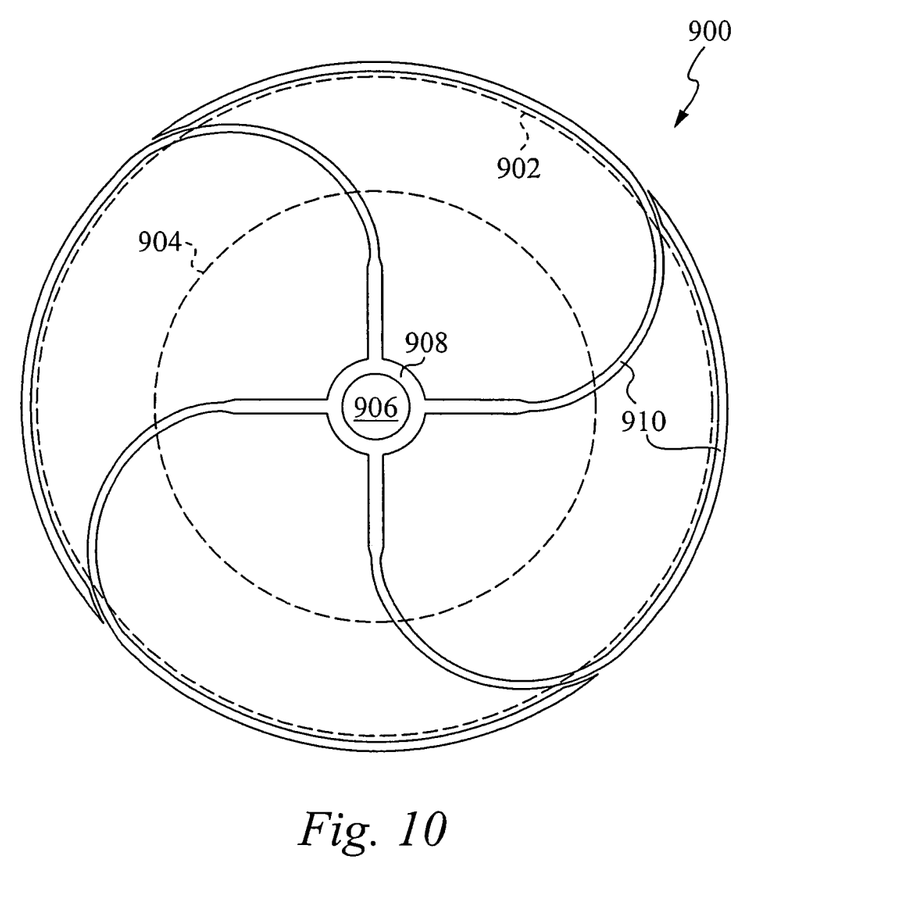
FIG. 10 shows a plan view of the preferred embodiment to the press assembly of the present invention.
Figure 11:
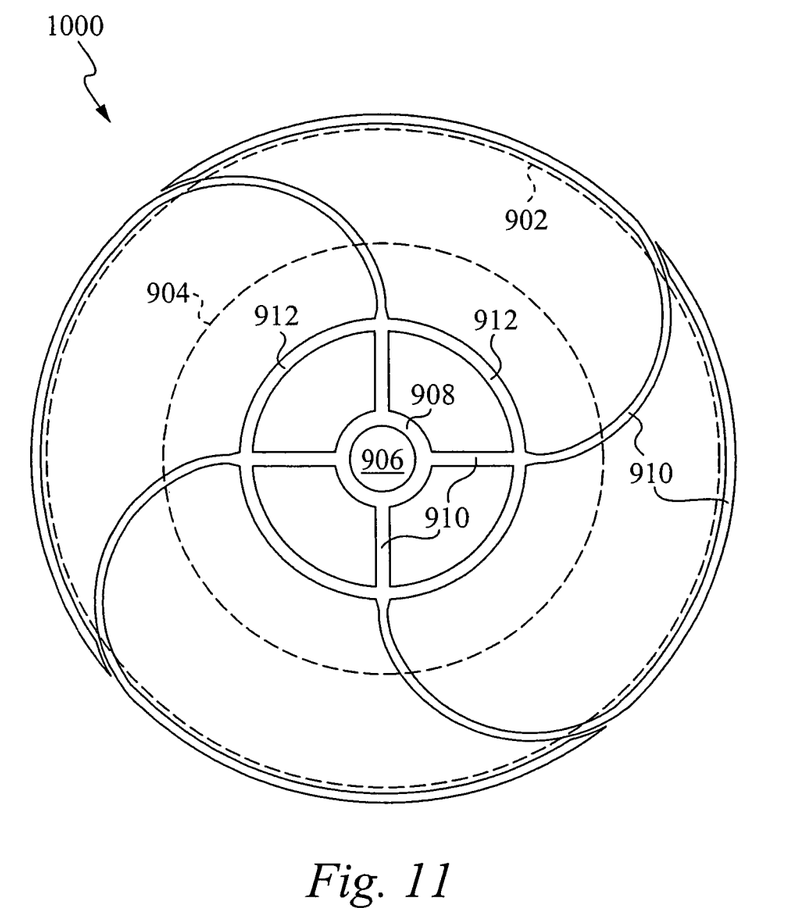
FIG. 11 shows a plan view of an alternate embodiment of the press assembly of FIG. 10.

FIG. 10 shows the pressing plate 900 of the preferred embodiment of the present invention. The pressing plate 900 is adapted to fit and compress within a conical frustum cup having a large upper radius shown by the dotted line 902 and a small lower radius shown by the dotted line 904. A central aperture 906 is adapted to receive a rod (FIG. 11). An inner ring 908 surrounds the central aperture 906. A plurality of arms 910 extend from the inner ring 908 in a spiral manner all extending in the same direction. The spiral shape is any general spiral shape. There are four arms 910 shown in the embodiment of FIG. 9. This number of arms is exemplary only; the invention can be implemented with less or more arms. The arms 910 are preferably thin as shown but thicker in the dimension perpendicular to the plane of the drawing of FIG. 10. This allows the arms 910 to resiliently flex in the plane of the drawing of FIG. 10 but to be relatively rigid perpendicular to the drawing. Barbs (1204 FIG. 12) for engaging a compressible filter member extend into the plane of the drawing and are shown below in FIG. 12. Preferably all the elements of the pressing plate 900 are integrally formed of injection molded plastic.

FIG. 11 shows another version of this preferred embodiment. As will be discussed below, the preferred pressing plates 900 and 1000 are used with a compressible filter member. That filter member is also flexible. The spacing between the arms 910 in certain circumstance may allow the filter member to flex upwardly into the cup between the arms 910. Depending upon the amount of bending deflection and support for the filter (FIG. 10) that is desired, a stabilizing ring 912 can be employed.

The user manually compresses the arms 910 to insert the pressing plate 900 and 1000 into the top of a cup. The arms 910 are sufficiently thin and flexible to readily bend, yet are sufficiently resilient that the elastic restoring force of the material presses the arms 910 outwardly toward the interior surface of the cup. As the rod (not shown) is used to deploy the pressing plate 900 toward the bottom of the cup, the arms 910 progressively overlap one another and the external radius of the pressing plate decreases.

Figure 12:
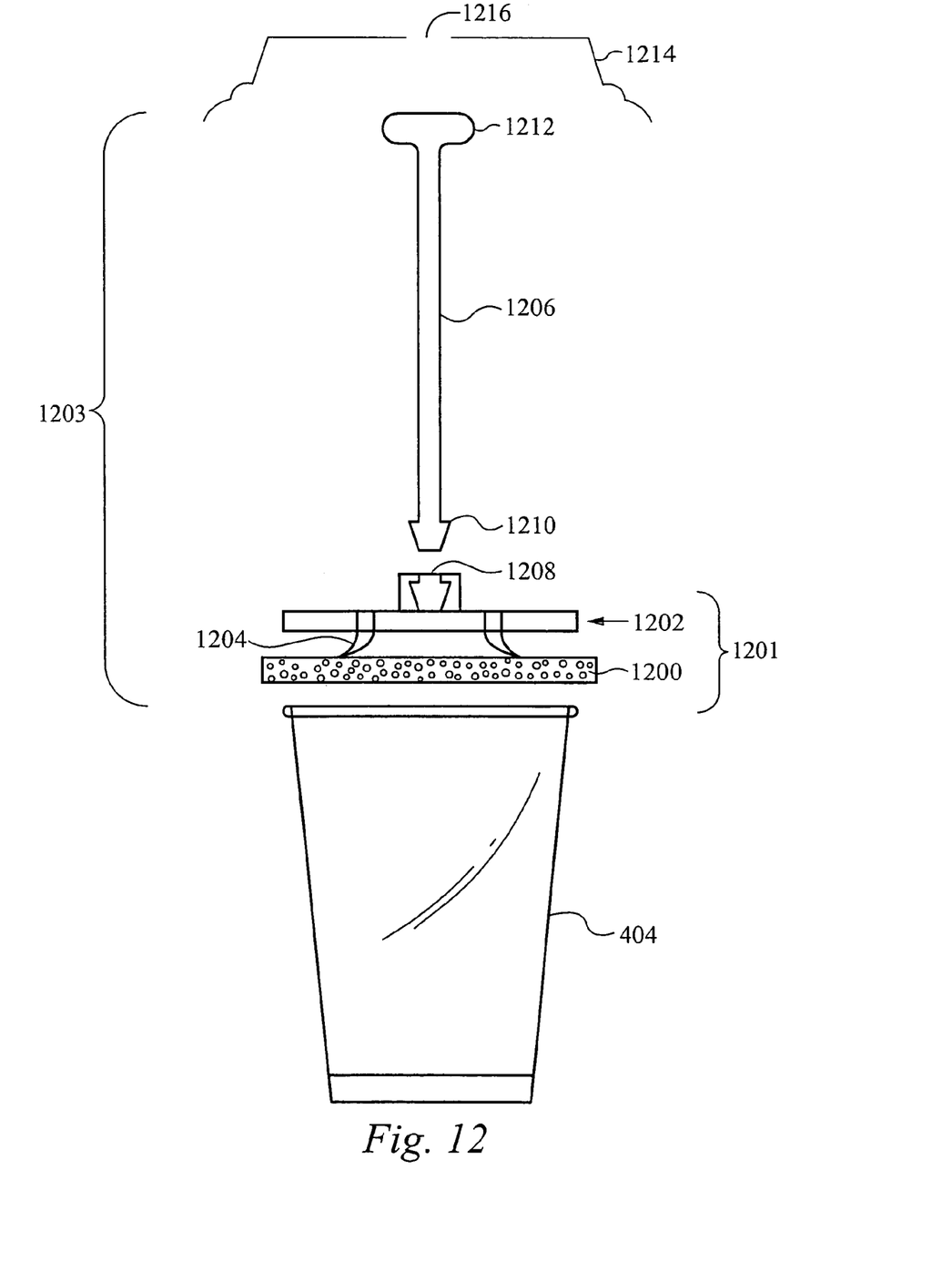
FIG. 12 shows an exploded view of the preferred embodiment of the present invention, in relation to a perspective section of a beverage cup.

FIG. 12 shows a side view of the preferred embodiment of the present invention. The filter member is a foam filter 1200 which is sized to be somewhat larger than the upper radius of the cup 404. Preferably, the radius of the foam filter 1200 will have a radius that is between ¼ inch to ½ inch larger than the upper radius of the cup 404. The foam filter 1200 is preferably formed of an open cell or a closed cell polypropylene or polyethylene. Voids formed in the foam filter 1200 are sized sufficiently large to allow liquid to pass through the foam filter 1200 but not particles such as ground coffee; preferably, no filter membrane such as a paper filter is used.

A compressible pressing plate 1202 (900 FIG. 10 or 1000 FIG. 11) is adapted to attach to the foam filter 1200 using barbs 1204 which are integrally formed with the pressing plate 1202. The barbs 1204 can be formed to extend from the arms 910 (FIGS. 10 and 11) or the stabilizing ring 912 (FIG. 11) or both. While the drawing of FIG. 12 shows a gap the length of the barbs 1204 between the pressing plate 1202 and the foam filter 1200, in operation, the barbs 1204 will penetrate into the foam filter 1200 and the gap will be reduced, in some cases to zero. The pressing plate 1202 mounted to the foam filter 1200 is a compressible filter assembly 1201.

A rod 1206 is mounted to pressing plate 1202. In the preferred embodiment, the rod 1206 is separate from the pressing plate 1202. In such a construction, the pressing plate includes a socket 1208 (corresponding to 906 FIGS. 10 and 11) to receive the rod 1206. The rod 1206 can include a protrusion 1210 adapted to engage the socket 1208. In the alternative, the rod 1206 and the pressing plate 1202 can be formed integrally as a single unit. The combination of the rod 1206 and the compressible filter assembly 1201 is the press assembly 1203. The rod 1206 and the pressing plate 1202 are preferably formed of injection molded plastic.

The rod 1206 preferably includes a T-shaped expansion 1212 at the distal end which is adapted to provide a more comfortable pushing surface for a finger or thumb of a user. Ideally, once the press assembly 1203 is mounted to the cup 404, a lid 1214 is mounted to the cup 404 over the press assembly 1203. An aperture 1216 is formed or cut in the center of the lid 1214 to accommodate the rod 1206. When the press assembly 1203 is deployed to the bottom of the cup 404, the expansion 1212 preferably substantially fills the aperture 1216. Alternatively, the expansion 1212 is pushed to a level sufficiently close to the lid 1214 where it will not interfere with a user comfortably drinking the beverage while the deployed press assembly 1203 is in place.

Figure 13:
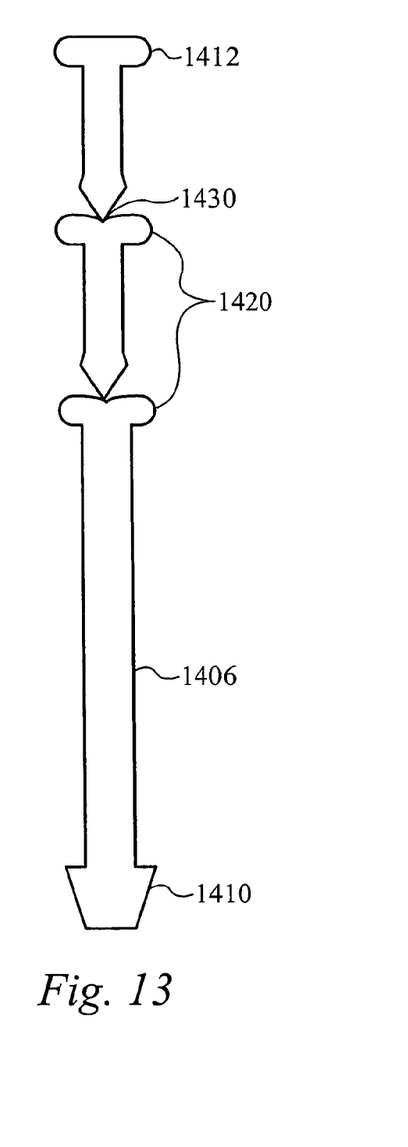
FIG. 13 shows a cross section view of the preferred rod of the present invention.

Ideally, the amount of compression possible in a compressible filter assembly 1201 can accommodate a variety of sizes of cups 404. It will be apparent that a rod 1206 that accommodates a large cup will extend beyond the lid 1214 for a small cup. A variety of sizes of rods 1206 can be provided. However, FIG. 13 shows a rod 1406 which is adaptable to a number of sizes of cups. The rod 1406 includes a protrusion 1410 to mate with the socket 1208 (FIG. 12). The rod 1406 also includes an expansion 1412 at the distal end of the rod. The rod 1406 also includes one or more selectable expansions 1420. Immediately toward the distal end of the rod 1406 from each selectable expansion 1420 the rod has a thinned region 1430. Each thinned region 1430 is sufficiently thick to allow the rod to be used in its entirety. Each thinned region 1430 is sufficiently thin to allow a user to readily break the rod. Preferably, the central portion of each selectable expansion 1420 is depressed so that if the rod is broken at one of the thinned regions 1430, any sharp portion of plastic remaining after the break is safely below the surface of the selectable expansion 1420 which remains at the new distal end of the rod 1406.

Figure 14:
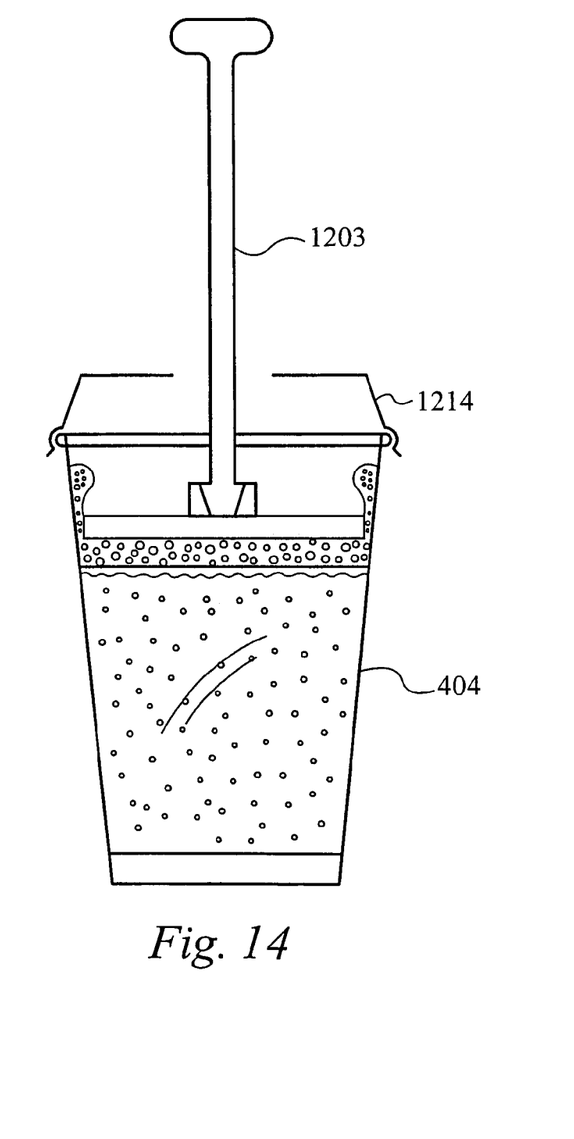
FIG. 14 shows a side view of the embodiment of the present invention of FIG. 12, in relation to a cross section of the beverage cup as the press assembly is engaged with the cup.
Figure 15:
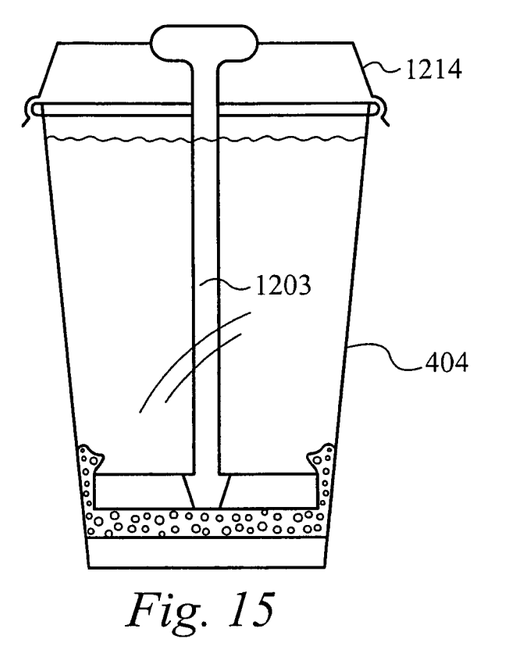
FIG. 15 shows a side view of the embodiment of the present invention of FIG. 12, in relation to a cross section of the beverage cup as the press assembly is deployed to the bottom of the cup.

FIG. 14 shows the pressing assembly 1203 mounted into a cup 404. The filter member 1200 (FIG. 12) is pressed between the pressing plate 1202 and the interior surface of the cup 404. The filter member 1200 also wraps around the pressing plate 1202 as shown. In FIG. 14, the lid 1214 is mounted in place. FIG. 15 shows the cup 404 and pressing assembly 1203, once the pressing assembly 1203 is deployed to the bottom of the cup. The top of the rod 1206 is substantially coincident with the lid 1214 so that the beverage can be conveniently and comfortably consumed.

Figure 16:
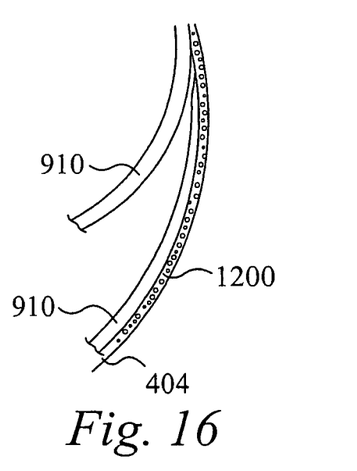
FIG. 16 shows a partial plan view of the preferred embodiment of the present invention.

FIG. 16 shows a partial expanded view of the overlapping arms 910 within the cup 404 with the filter member 1200 interposed in between. As the arms 910 slide over one another it is preferable that the profile of the tip of each arm 910 be sufficiently small to avoid puncturing and thereby tearing the filter member 1200. The profile of the leading edge of each tip can be adjusted to properly compensate for the thickness of the arms 910, the characteristics of the foam in the filter member 1200 including such factors as density, friction porosity and the like. Moreover, any irregularities in the profiles, owing either to the overlap of tip of one arm 910 relative to another arm or to uneven bending of an arm 910 owing to manufacturing variances will be advantageously filled by the filter member 1200.

Figure 17:
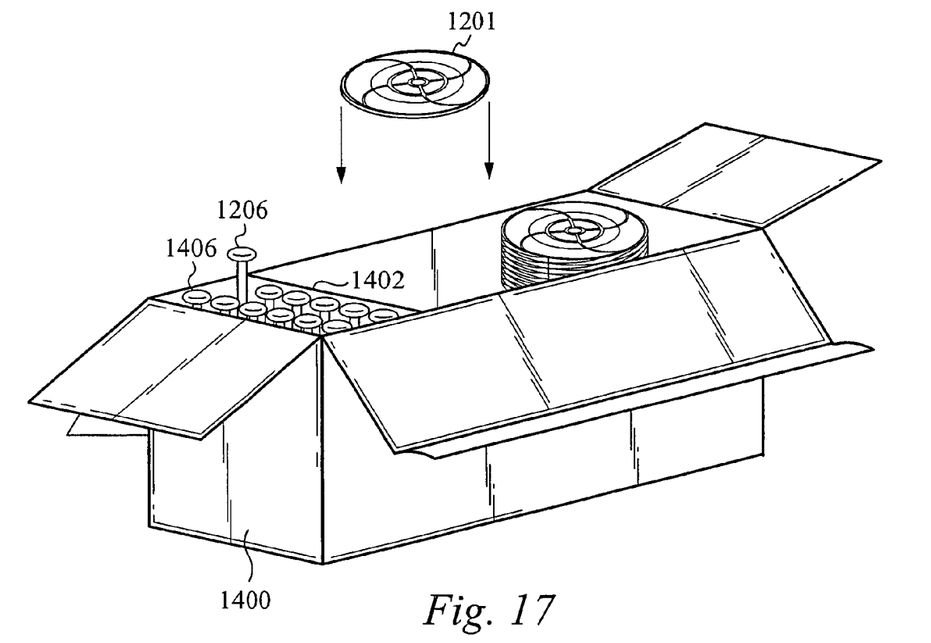
FIG. 17 shows a perspective view of the preferred embodiment of the present invention including packaging features.

The rod 1206 and the pressing assembly 1201 are preferably formed separately to accommodate packaging the devices for shipment. For example, FIG. 17 shows a paperboard container 1400 can be constructed to hold a number of compressible filter assemblies 1201 which are stacked, one on top of the next as shown. The container 1400 can include a segregation storage wall 1402 for holding a corresponding number of rods 1206 and/or 1406. The container 1300 can include a folded flap 1304 to act as a lid, in the usual manner of paperboard containers. Alternatively, the container 1300 can include a removable lid (not shown). When the rod 1206 and the compressible filter assembly 1201 are separate, the shipping density is enhanced.

The invention has been described relative to certain preferred and alternate embodiments. The selection of those particular embodiments are not intended to be limiting of the invention. It will be apparent to those of ordinary skill in the art after reading the disclosure, reviewing the drawings and the appended claims that certain changes and modifications are apparent. Such variations are within the scope of this invention.

What I claim is:

1. A compressible infusion press for separating infusion material from an infused liquid in a cup shaped as a conical frustum, the cup having an opening with a first radius at a proximal end of the vessel and a closed distal end with a second radius wherein the first radius is larger than the second radius, the compressible infusion press comprising:
    a. a flexible compressible filter member of a size to at least span the opening and having pores sized to pass the infused liquid but not the infusion material;
    b. a substantially planar radially compressible filter support configured to maintain the filter member in contact with an interior surface of the vessel, the compressible filter support having a plurality of arms extending from an interior support wherein the arms bend inwardly in the plane to accommodate the second radius such that the compressible support remains substantially planar even while its radius reduces; and
    c. a plunger element coupled to the filter support and configured for pushing the filter support and the filter member through vessel from the proximal end substantially to the distal end.

2. The press filter according to claim 1 wherein the compressible filter membrane comprises a foam member.

3. The press filter according to claim 2 wherein the foam member comprises an open cell foam.

4. The press filter according to claim 1 wherein the compressible filter support is mounted to the flexible compressible filter member such that the compressible filter member is closer to the distal end of the cup.

5. A compressible infusion press for separating infusion material from an infused liquid in a conventional paper coffee cup shaped to allow nested stacking of multiple cups, the cup having an opening with a first radius at a proximal end of the vessel and a closed distal end with a second radius wherein the first radius is larger than the second radius, the compressible infusion press comprising:
    a. a flexible compressible filter member of a size to at least span the opening and having pores sized to pass the infused liquid but not the infusion material;
    b. a substantially planar radially compressible filter support configured to maintain the filter member in contact with an interior surface of the vessel, the compressible filter support having a plurality of arms extending from an interior support wherein the arms bend inwardly in the plane to accommodate the second radius such that the compressible support remains substantially planar even while its radius reduces; and
    c. a plunger element coupled to the filter support and configured for pushing the filter support and the filter member through vessel from the proximal end substantially to the distal end.

6. The press filter according to claim 5 wherein the compressible filter membrane comprises a foam member.

7. The press filter according to claim 6 wherein the foam member comprises an open cell foam.

8. The press filter according to claim 5 wherein the compressible filter support is mounted to the flexible compressible filter member such that the compressible filter member is closer to the distal end of the cup.

9. A system for pressing a coffee beverage for separating ground coffee an infused beverage, comprising:
    a. in a conventional paper coffee cup shaped to allow nested stacking of multiple cups, the cup having an opening with a first radius at a proximal end of the vessel and a closed distal end with a second radius wherein the first radius is larger than the second radius;
    b. a flexible compressible filter member of a size to at least span the opening and having pores sized to pass the infused liquid but not the infusion material;
    c. a substantially planar radially compressible filter support configured to maintain the filter member in contact with an interior surface of the vessel, the compressible filter support having a plurality of arms extending from an interior support wherein the arms bend inwardly in the plane to accommodate the second radius such that the compressible support remains substantially planar even while its radius reduces; and
    d. a plunger element coupled to the filter support and configured for pushing the filter support and the filter member through vessel from the proximal end substantially to the distal end.

10. The press filter according to claim 9 wherein the compressible filter membrane comprises a foam member.

11. The press filter according to claim 10 wherein the foam member comprises an open cell foam.

12. The press filter according to claim 9 wherein the compressible filter support is mounted to the flexible compressible filter member such that the compressible filter member is closer to the distal end of the cup.

* * * * *